Patented Jan. 25, 1944

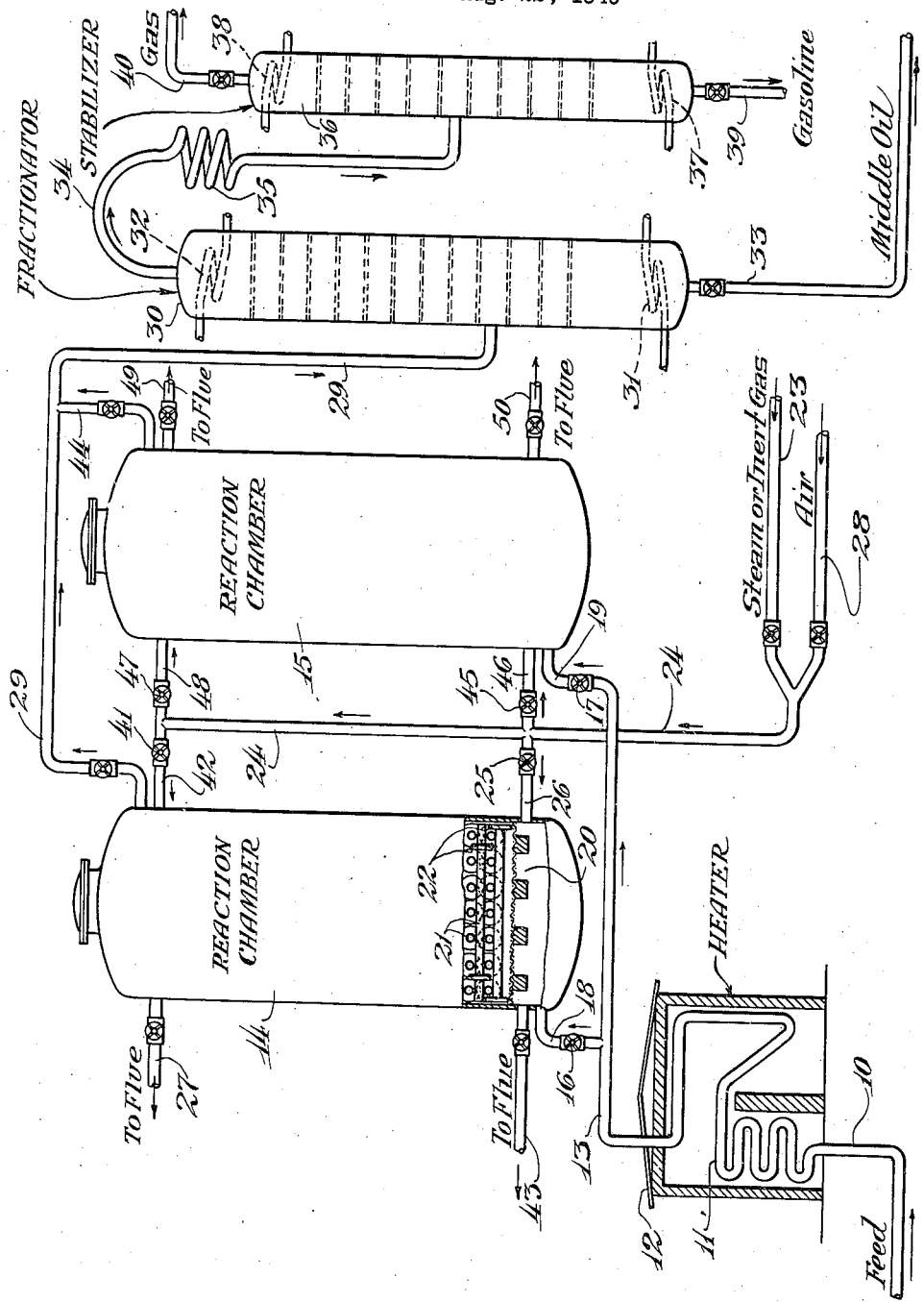

2,339,894

UNITED STATES PATENT OFFICE 2,339,894

CATALYTIC CONVERSION PROCESS AND APPARATUS

Vanderveer Voorhees, Hammond, Ind., assignor to Standard Oil Company, Chicago, Ill., a corporation of Indiana Application August 22, 1940, Serial No. 353,595

11 Claims. (Cl. 196—52)

This invention relates to catalytic conversion and pertains more particularly to the catalytic cracking of petroleum oils for the production of high quality motor fuels.

It is well known that during the catalytic cracking, reforming, isoforming, aromatization, dehydrogenation, etc., of hydrocarbons and hydrocarbon mixtures over solid granular catalysts, various amounts of carbon and similar impurities are deposited on the catalyst, thereby masking its effectiveness and reducing substantially its catalytic activity. The catalytic activity can be restored partially or substantially in toto by burning off the carbon and other deposits from the catalyst. In catalytic cracking, reforming, dehydrogenation, aromatization, isoforming, etc., the reaction is endothermic, requiring therefore the addition of heat to maintain the reactants at conversion temperatures. The regeneration of the catalyst, on the other hand, is exothermic, considerable quantities of heat being released during the burning-out process, and it often becomes necessary to provide means for controlling or dissipating the heat in order to avoid overheating of the catalyst and thus destroying its activity entirely.

It is an object of my invention to provide a method and means for supplying the heat required for catalytic conversion of hydrocarbons over solid granular catalysts and for controlling and utilizing the heat generated by the catalyst regeneration. Another object of my invention is to provide an improved process for controlling the reaction temperatures in the catalytic conversion of hydrocarbon oils. A further object of my invention is to provide a method and means for preventing excessive temperatures during catalyst regeneration. An additional object of this invention is to provide relatively inexpensive and permanent means for the control of reaction temperatures during catalytic conversion of hydrocarbon oils and the regeneration of the catalyst used therein. Further objects and advantages of my process will become apparent from the following description thereof, read in conjunction with the accompanying drawing which forms a part of this specification.

The drawing is a flow diagram, partly in section, illustrating one embodiment of my invention.

Briefly stated, this invention relates to a catalytic conversion process in which tubes, or other containers, filled with fusible salts are distributed within the catalyst chamber in close heat conductive contact with the catalyst therein, to control the temperature of the conversion reaction and/or of the regeneration within definite desired ranges. As salts I can use a single salt having a melting point approximately that desired for controlling the temperature of the conversion reaction, or the temperature of the catalyst regeneration; a mixture of salts, the mixture having a melting point approximately that desired for controlling the temperature of the conversion reaction or the temperature of the catalyst regeneration; a mixture of salts, part of which have a melting point approximately that desired for controlling the temperature of the conversion reaction and the remainder a melting point approximately that desired for controlling the temperature of the catalyst regeneration, or the mixture can contain various salts which vary throughout the range desired from that for controlling the conversion reaction temperature to that for controlling the regeneration temperature; salt or salt mixtures having a melting point approximately that desired for controlling the temperature of the conversion reaction in one set of tubes and salt or salt mixtures having a melting point approximately that desired for controlling the temperature during catalyst regeneration in another set of tubes within the same reactor.

While this invention is applicable to endothermic catalytic processes generally, it will be described in detail in connection with the catalytic cracking of a Mid-Continent gas oil over Super-Filtrol — an activated hydrosilicate of alumina in which the ratio of silica to alumina is about 3.3 by weight or about 5.63 by mols. The catalyst per se forms no part of the present invention, other catalysts being used with equal suitability. It should be understood that the invention is equally applicable to silica gel catalysts on which alumina or magnesia is deposited and on which various promoters, such as copper, cadmium, manganese, nickel, etc., may be adsorbed.

Referring now to the drawing: Feed stock, which may be a 35° A. P. I. Mid-Continent gas oil, is charged through line 10 to coils 11 of pipe still 12, wherein oil is vaporized and heated to a transfer line temperature of from about 850 to 1000° F., preferably about 925° F. Transfer line 13 is manifolded whereby the heated products may be discharged into either catalyst chamber 14 or catalyst chamber 15 while the other is being regenerated. Valves 16 and 17 in lines 18 and 19 respectively control the discharge of the heated products to either reaction chamber. The pressure is preferably from atmospheric to about 100 pounds per square inch and the space velocity of the hydrocarbon charge through the catalyst chamber is about 0.25 to 2.0 volumes of liquid feed per gross volume of catalyst per hour.

Referring now specifically to reaction chamber 14, a false bottom 20 at the base of the tower supports the granulated catalyst over a chromel wire screen. Resting on the screen is a layer of spaced tubes 21 filled with fusible salt, the tubes being conveniently spaced by spacing rings 22 which may be loosely slipped over them or welded to them. The spacing rings 22 assure a definite distance between the tubes to be filled with catalyst providing for free flow of vapors upward through the tower without obstruction.

Alternate layers of tubes can be placed at right angles, each layer supporting the next layer above it. This arrangement provides for a large uniformly disposed tube surface throughout the catalyst bed, insuring that no part of the catalyst will be overheated during regeneration. The tubes should be incompletely filled with a fusion salt to allow room for expansion and contraction during fusion and solidification. For simplicity in construction the tubes may be welded shut. Either steel or alloy tubes, for example, chrome-alloy tubes, can be used to avoid corrosion.

In operation the tubes can be partially filled with a salt melting at about 1200° F., for example, and the catalyst packed around the tubes. As fusion salts of suitable melting point I may include the eutectic mixture of barium and potassium chlorides having the composition $BaCl_2.2KCl$, which melts at about 1225° F., or straight manganese chloride which melts at 1202° F. Another suitable salt mixture within this general range is one containing 40 mol per cent cuprous chloride and 60 mol per cent sodium chloride which melts at about 1130° F.

To begin with, the catalyst can be preheated by hot oil vapors or by superheated steam until the desired reaction temperature, e. g., 925° F. is obtained. Superheated gas oil vapors may be passed through the catalyst until the activity of the catalyst is substantially diminished.

Cracked vapors from catalyst chamber 14 pass overhead through line 29 and are discharged into fractionating tower 30. This tower may be equipped with a suitable reboiler 31 and a reflux means 32 at the top, the conditions being so regulated as to remove products heavier than gasoline through line 33 and to remove gasoline and gases through line 34, having cooler 35 therein, to stabilizer 36.

Stabilizer 36 is also provided with heating means 37 and reflux means 38, gasoline being withdrawn through line 39 for storage and gaseous hydrocarbons being withdrawn through line 40 for further use or refinement.

These gases for example, preferably after the removal of hydrogen, methane and possibly ethane and ethylene therefrom, can be sent through a polymerization or alkylation system or can be recycled to line 10 for further conversion with the feed stock. The gas oil and heavy products from line 33 can be discharged to a thermal cracking or gas reversion process or they can be recycled with the feed stock in line 10. The particular utilization of these products forms no part of the present invention and will not be described in greater detail.

When the catalyst activity has substantially decreased the oil vapors are cut off by closing valve 16 in line 18 and gas vapors are purged with steam or inert gases from line 23 which joins line 24. This is preferably done by opening valve 25 in line 26 which leads from line 24 to the base of tower 14, the purging gases escaping through valved line 27. Air or air diluted with inert gas can be introduced into the catalyst chamber from line 28 which also joins line 24, and can be introduced into the catalyst chamber while it is still hot and above the ignition temperature; valve 25 in line 26 remaining open. The temperature of the catalyst will rise when combustion takes place until it reaches the fusion point of the salt, for example, 1202° F., whereupon the temperature will rise no further until all of the salt in the tube is melted, the salt absorbing the excess heat as latent heat of fusion. As a result, the fusible salt imposes a definite ceiling for the temperature, thus protecting the catalyst from overheating beyond this point. At the same time, the sensible heat-absorbing capacity of the catalyst and steel is available for absorbing the heat of regeneration throughout the temperature range between 925 and 1205° F., and particularly the latent heat of fusion is available for absorbing heat at melting point of the salt.

Under ordinary operating conditions the catalyst will be permitted to accumulate only that amount of carbon which can be burned off rapidly without supplying more heat than that necessary to fuse all of the salt. For conservative operations it is advisable to limit the amount of carbon deposition somewhat below this point. After the catalyst is regenerated and the air is purged from the catalyst chamber by steam or inert gas entering from line 23, hydrocarbon vapors are again introduced. The temperature of the catalyst at this point can be regulated by the amount of purging gas passed through it, if desired. It is desirable to pass the purging gas through the catalyst chamber in the opposite direction to that of the regeneration air, inasmuch as during regeneration that part of the catalyst first regenerated will become cooled by the influx of cool regeneration air. By purging in the opposite direction the cooled catalyst will be reheated to the desired cracking temperature. This may be accomplished by closing valve 25 in line 26 and introducing the purging gas through valve 41 and line 42 to the upper part of reactor 14, the purging gas escaping through valved line 43.

Meanwhile, while reaction chamber 14 is being regenerated, hydrocarbon vapors are passed through reactor 15 by opening valve 17 in line 19, the cracked vapors passing overhead through line 44 which joins line 29 leading to fractionating tower 30. After the catalyst in fractionator 15 has become exhausted, it can also be regenerated by passing purging gas and air througn line 45 and valve 46 and/or valve 47 in line 48, the gas escaping through lines 49 and 50 respectively. Although I have illustrated this process by showing two reaction chambers, it should be understood that as many reactors can be employed, in parallel or in series, as may be desired.

Under some conditions when using a single salt mixture in the tubes, the heat of solidification of the salt may not be available for cracking, i. e., the salt may all have solidified before the cracking cycle begins. In those cases, however, where there is a considerable amount of supercooling of the salt mixture after regeneration, particularly where this supercooling amounts to as much as 100 or 200° F., the heat of solidification is readily available for the cracking cycle. Where little supercooling occurs due to the nature of the salt used, it is advisable to use salt mixtures whose fusion temperature is near the cracking temperature and carry out the regeneration at this relative lower temperature. By using mixtures of salts having a considerable spread in melting point, e. g., 100 to 400° F., the solidification will occur progressively over a range as the temperature falls, thus providing sustained heat for the conversion reaction. Accordingly, it is often desirable to use a mixture of salts having an upper fusion limit corresponding to the desired regeneration temperature and a lower fusion limit corresponding to the desired temperature for conversion. Such a mixture of salts may include mixtures of lead and sodium chlorides having the formula $2PbCl_2.NaCl$ in mixture with a eutectic mixture of barium and potassium chlorides having the formula $BaCl_2.2KCl$; a mixture of lead chloride and manganese chloride; and other similar mixtures including two or more salts or eutectic compositions of divergent melting points.

Alternatively, it is often highly advantageous to use two or more salt mixtures of different melting points distributed over the range between the cracking temperature and the regeneration temperature contained in different tubes dispersed throughout the catalyst bed. For example, in one embodiment of my invention I employ an arrangement wherein alternate tubes are charged with a salt mixture melting at, say, 900° F., and the remainder charged with a salt mixture melting at 1100° F. Suitable salts and salt mixtures would include lead bromide (melting point 914° F.), lead chloride (melting point 905° F.), etc., and a 50 mol per cent mix of lead fluoride and lead chloride (melting point 1114° F.). A eutectic mixture of potassium lead chloride can also be employed, with or without additional potassium chloride. For the higher melting salts and salt mixtures, 60 mol per cent manganese chloride, and 40 mol per cent calcium chloride (melting point 1094° F.), or 60 mol per cent calcium chloride, 40 mol per cent sodium chloride (melting point 1031° F.) can be suitably employed.

In the regeneration cycle, the temperature is allowed to rise to the top of the range, at which point the high melting salt fuses and resists any further temperature rise, thereby preventing overheating and deterioration of the catalyst. During cracking, the temperature falls to the bottom of the range but not below because of the heat liberated by the freezing of the low-melting salt. When all of the low-melting salt is solidified, the cracking cycle can be interrupted and regeneration repeated. The tubes can be alternated throughout the catalyst bed or placed in alternate layers. If the amount of carbon produced during cracking to a point where all low-melting salt is solidified is more than enough to melt all of the high-melting salt on regeneration, then the proportion of high-melting to low-melting salt can be increased to compensate for this lack of balance. This proportion depends upon the type of stock treated, and particularly upon its carbon forming propensities.

The particular salt mixture selected will depend upon various factors, particularly on the thermal stability of the catalyst which determines the maximum regeneration temperature to be employed. Various mixtures, particularly those which approach eutectic composition where slight changes in the composition have little effect on fusion temperature, can be selected for practically any temperature desired.

From the above description, it will be apparent that I have set forth an improved method and means whereby the reaction temperature during catalytic cracking and/or regeneration can be controlled within definite predetermined limits without the necessity of elaborate systems of heat exchange between the catalyst and the cooling or heating source. My invention should not be confused with systems employing molten metals, salts or salt mixtures as a heating medium, nor with processes employing a circulating fluid to control the heat of reaction. The apparatus is self-contained, simple and economical to construct since there is no necessity for elaborate designs of heating tubes, or geometrically designed passages for directing the flow of gases. Moreover, the salts do not deteriorate with use, since there is no contamination from the feed stock undergoing conversion or other sources, nor is there loss of salt by evaporation or handling.

For convenience, in this application the latent heat of fusion and the latent heat of solidification will be considered to mean the same, heat being absorbed during fusion and released during solidification.

Although I have described my invention in relation to catalytic cracking, it should be understood that this is by way of illustration and not by way of limitation, and that it is equally applicable to other catalytic conversion processes involving endothermic reactions, such as dehydrogenation, aromatization, isoforming, reforming, etc., and that I intend to be limited only as set forth in the appended claims.

I claim:

1. The process of converting hydrocarbon oils into high knock-rating motor fuels which comprises heating said oil in a flowing stream to a high conversion temperature and thereby producing hot vapors, passing the hot vapors through a bed of solid granular hydrocarbon conversion catalyst to effect the desired conversion with absorption of heat by the endothermic reaction until said catalyst is substantially reduced in activity as a result of the deposition of carbonaceous matter thereon, interrupting the flow of oil vapor through said catalyst bed, regenerating said catalyst by burning with an oxygen-containing gas, thereby raising the temperature of the catalyst bed by the exothermic heat of combustion, and limiting the rise and fall of temperature in said catalyst bed by distributing therethrough out of direct contact therewith a stationary solid substance having a high latent heat of fusion and a melting point about the desired upper temperature range for regeneration and another solid substance having a high latent heat of fusion and a melting point about the lower range of temperature desired for conversion.

2. The process of converting hydrocarbon oils into high knock-rating motor fuels which comprises heating said oil in a flowing stream to a temperature within the range of about 850 to 1000° F., passing the hot products through a bed of solid conversion catalyst to effect the desired conversion with absorption of heat by the endothermic reaction until said solid conversion catalyst is substantially reduced in activity as a result of the deposition of carbonaceous matter thereon, interrupting the flow of oil through said solid conversion catalyst, regenerating said solid conversion catalyst by burning with oxygen, thereby raising the temperature of said solid conversion catalyst bed by the exothermic heat of combustion to a temperature within the range of about 1130 to 1225° F., and limiting the rise and fall of temperature in said solid conversion catalyst bed by distributing therethrough out of direct contact therewith a stationary solid substance selected from the group consisting of salt and salt mixtures having a high latent heat of fusion and a melting point within the range of about 1130 to 1225° F., and another solid substance selected from the group consisting of salts and salt mixtures having a high latent heat of fusion and a melting point within the range of about 850 to 1000° F.

3. The process of converting hydrocarbons in an endothermic reaction which comprises passing their vapors in a flowing stream at a high conversion temperature through a bed of solid granular conversion catalyst to effect the desired conversion with absorption of heat by the endothermic reaction until said catalyst is substantially reduced in activity as a result of the deposition of carbonaceous matter thereon, interrupting the flow of oil vapor through said catalyst bed, regenerating said catalyst by burning with oxygen, thereby raising the temperature of the catalyst bed by the exothermic heat of combustion to a point substantially above said conversion temperature, and limiting the rise and fall of temperature in said catalyst bed by distributing therethrough in thermal relation with said catalyst but isolated therefrom at least two crystalline materials having high heats of fusion and different melting points, said melting points lying within the temperature range between said conversion temperature and said regeneration temperature, the solidification of said lower melting crystalline materials supplying heat for said conversion reaction and the fusion of said higher melting crystalline materials serving to cool said regeneration reaction and prevent injury to the catalyst as the result of overheating.

4. The process of converting hydrocarbon oils into high knock-rating motor fuels which comprises heating said oil in a flowing stream to a high conversion temperature, passing the hot vapors therefrom through a bed of solid granular hydrocarbon conversion catalyst to effect the desired conversion with absorption of heat by the endothermic reaction until said catalyst is substantially reduced in activity as a result of the deposition of carbonaceous matter thereon, interrupting the flow of oil vapor through said catalyst bed, regenerating said catalyst by burning with an oxygen-containing gas, thereby raising the temperature of the catalyst bed by the exothermic heat of combustion, and limiting the rise and fall of temperature in said catalyst bed by distributing therethrough out of direct contact therewith a stationary solid substance having a high latent heat of fusion and a melting point about the desired upper temperature range for regeneration and another solid substance having a high latent heat of fusion and a melting point about the lower range of temperature desired for conversion, said last mentioned solid substance being maintained out of direct contact with said first mentioned solid substance.

5. In apparatus for the conversion of a hydrocarbon oil into a high knock-rating motor fuel, including heating means for vaporizing a substantial portion of said hydrocarbon oil, a plurality of catalyst chambers filled with a solid granular hydrocarbon conversion catalyst communicating by manifold means with said heating means, conduits leading from said catalyst chambers to a fractionation system, and inlet and outlet means in said catalyst chambers for the introduction and discharge of regeneration gases, the improvement comprising a plurality of horizontal noncommunicating elongated tubular means partially filled with a solid substance having a melting point within the range of from 850 to 950° F., and other horizontal noncommunicating elongated tubular means partially filled with a solid substance having a melting point within the range of from 1000 to 1225° F. said first-mentioned tubular means and said second-mentioned tubular means being spaced in alternate layers throughout said catalyst chambers, each horizontal layer being at substantially right angles to the adjacent layer.

6. The process of converting hydrocarbon oils into high knock-rating motor fuels which comprises passing a hydrocarbon oil at a high conversion temperature through a bed of solid granular conversion catalyst to effect the desired conversion with absorption of heat by the endothermic reaction until said catalyst is substantially reduced in activity as a result of the deposition of carbonaceous matter thereon, interrupting the flow of oil vapor through said catalyst bed, regenerating said catalyst by burning with oxygen, thereby raising the temperature of the catalyst bed by the exothermic heat of combustion, and limiting the rise and fall of temperature in said catalyst bed by maintaining a distribution therein of a plurality of separately solidifiable and fusible substances of high heats of fusion and different melting points within the approximate range of 850 to 1225° F. at least one of said substances being normally solid at ordinary conversion temperatures and normally liquid at ordinary regeneration temperatures and at least one other of said substances being normally solid at ordinary regeneration temperatures and fusible at higher temperatures whereby one of said substances absorbs heat of fusion during regeneration and releases said heat during conversion while the other of said substances prevents regeneration temperatures from exceeding safe limits below which said catalyst will not be damaged.

7. The process of claim 1 wherein said solid substances of high latent heat of fusion are maintained in contact during the operation of said process.

8. The process of claim 1 wherein the said solid substances having a high latent heat of fusion are isolated from each other during the operation of said process.

9. The process of claim 2 wherein said solid conversion catalyst is Super Filtrol.

10. In the process of converting hydrocarbons in an endothermic reaction wherein said hydrocarbons in vapor form are contacted at conversion temperature with a bed of porous, solid conversion catalyst, and a carbonaceous deposit is formed on said catalyst, the conversion operation is interrupted and said carbonaceous deposit is removed from said catalyst in an exothermic combustion reaction thereby regenerating said catalyst and thereafter said conversion operation is repeated with said regenerated catalyst, the improvement comprising absorbing heat from said exothermic combustion reaction by means of two fusible crystalline materials maintained in thermal contact with said catalyst and isolated therefrom, and supplying heat to said endothermic conversion reaction from the latent heat of solidification of said crystalline materials, one of said crystalline materials having a melting point appproximately that of the desired conversion temperature and the other having a melting point approximately that of the desired regeneration temperature.

11. Apparatus adapted for the conversion of hydrocarbons comprising a catalyst chamber, a bed of porous solid conversion catalyst within said chamber, means for alternately passing hydrocarbon vapors and oxygen-containing regeneration gas through said catalyst bed, means for delimiting the operating temperatures within said catalyst chamber including a first means for maintaining a first quantity of fusible crystalline material in thermal contact with said catalyst but isolated therefrom and a second means for maintaining a second quantity of fusible crystalline material in thermal contact with said catalyst but isolated therefrom, said first and second means comprising a plurality of horizontal, sealed isolated tubes incompletely filled with fusible crystalline material distributed through said catalyst bed in heat exchange relation with said catalyst, one of said fusible crystalline materials having a melting point approximating that of the desired conversion temperature and the other of said fusible crystalline materials having a melting point approximating that of the desired regeneration temperature.

VANDERVEER VOORHEES.